United States Patent
Dai et al.

(10) Patent No.: US 12,505,760 B2
(45) Date of Patent: Dec. 23, 2025

(54) SIMULATION DEVICE FOR ELECTRON-EXCITED ATMOSPHERIC RADIATION

(71) Applicant: Hefei Institutes of Physical Science, CAS, Hefei (CN)

(72) Inventors: Congming Dai, Hefei (CN); Xiaofeng Tang, Hefei (CN); Jianyu Li, Hefei (CN); Heli Wei, Hefei (CN); Honghua Huang, Hefei (CN); Wenyue Zhu, Hefei (CN)

(73) Assignee: Hefei Institutes of Physical Science, CAS, Hefei (CN)

( * ) Notice: Subject to any disclaimer, the term of this patent is extended or adjusted under 35 U.S.C. 154(b) by 450 days.

(21) Appl. No.: 18/203,990

(22) Filed: May 31, 2023

(65) Prior Publication Data

US 2023/0394990 A1 Dec. 7, 2023

(30) Foreign Application Priority Data

Jun. 2, 2022 (CN) .......................... 202210624444.7

(51) Int. Cl.
*G09B 23/22* (2006.01)
*G01N 23/2251* (2018.01)

(52) U.S. Cl.
CPC .......... *G09B 23/22* (2013.01); *G01N 23/2251* (2013.01); *G01N 2223/638* (2013.01)

(58) Field of Classification Search
CPC .... G09B 23/22; G09B 25/00; G01N 23/2251; G01N 2223/638; Y02A 90/10
USPC ......................................................... 434/31
See application file for complete search history.

(56) References Cited

U.S. PATENT DOCUMENTS

| 11,748,938 | B2 * | 9/2023 | Funazukuri | G06F 3/012 |
|---|---|---|---|---|
| | | | | 345/156 |
| 2021/0153801 | A1 * | 5/2021 | Tsoi | G06F 18/2155 |
| 2023/0221445 | A1 * | 7/2023 | Michel | G01S 7/4865 |
| | | | | 356/5.01 |
| 2023/0394990 | A1 * | 12/2023 | Dai | G01N 23/2251 |

FOREIGN PATENT DOCUMENTS

CN 113488831 A 10/2021

OTHER PUBLICATIONS

CN Application No. 202210624444.7, Chinese Office Action, dated Jun. 8, 2023.

* cited by examiner

*Primary Examiner* — Pierre E Elisca
(74) *Attorney, Agent, or Firm* — Patterson + Sheridan, LLP (57) ABSTRACT

Disclosed is a simulation device for electron-excited atmospheric radiation. An electron gun cavity is connected with a front end of a gas cavity. An electron gun is used for emitting electrons and injecting the electrons into the gas cavity. The electrons collide with gas molecules in the gas cavity to ionize and excite the gas molecules. According to the miniaturized simulation device for electron-excited atmospheric radiation, the device can realize an ionization excitation experiment of high-energy electrons on neutral gas and generate a series of optical radiation phenomena in special scenes. In addition, with the aid of optical observation equipment, optical radiation signals of ionized neutral gas can be obtained, so that radiation laws under different incident electron energies, different radiation intensities and different atmospheric components can be further obtained.

8 Claims, 8 Drawing Sheets

SIMULATION DEVICE FOR ELECTRON-EXCITED ATMOSPHERIC RADIATION

CROSS-REFERENCE TO RELATED APPLICATION

This patent application claims the benefit and priority of Chinese Patent Application No. 202210624444.7, filed with the China National Intellectual Property Administration on Jun. 2, 2022, the disclosure of which is incorporated by reference herein in its entirety as part of the present application.

TECHNICAL FIELD

The present disclosure relates to the technical field of radiation simulation, in particular to a simulation device for electron-excited atmospheric radiation.

BACKGROUND

Near space generally refers to the part of the vertical section of the atmosphere with a height of 20-120 km from the ground, including the stratosphere, the middle layer and the bottom of the thermosphere. Near space is similar to the research concept of medium-high rise atmosphere in atmospheric physics and environmental science. The research on material and energy cycle and reaction kinetics of near space atmosphere is of great guiding significance for building a more scientific and reasonable environmental atmosphere model and engineering application of medium-high rise atmosphere.

The air in the near space is very thin, but main components and proportional distribution are similar to those of the surface atmosphere, including nitrogen and oxygen as the main components. Compared with the tropospheric atmosphere near the earth, there is very little water vapor in the near space without meteorological processes such as rain and snow. Due to a series of chemical/photochemical reactions caused by the irradiation of ultraviolet rays from the sun, neutral gas in the atmosphere is ionized, and then a large number of ions are produced, so that rich microscopic atmospheric components are constituted together with high-energy protons and neutrons entering from outer space. In addition, there are many optical phenomena in the near space, including airglow, aurora, noctilucent clouds and lightning in the middle atmosphere.

Compared with visible light imaging, an infrared imaging system has more advantages in some aspects of earth observation and real-time monitoring. Infrared observation can not only distinguish the surface topography but also be very sensitive to temperature changes, and plays an important role in preventing natural disasters, space-based target detection and energy mineral exploration. In order to improve the sensitivity of infrared remote sensing, appropriate observation bands need to be chosen, and the influence of environmental background radiation and atmospheric transmission effect on the detection ability of the imaging system needs to be considered.

An aerospace optical detection system is usually used for directly measuring the light radiation environment in the medium-high rise atmosphere, but this measurement method is very expensive. Due to the lack of understanding of the radiation characteristics of the high-rise atmosphere, the performance design of the optical detection system is quite insufficient. Therefore, it is necessary to carry out the ground simulation experiment research on the light radiation characteristics of the thin atmosphere at high rise. The radiation measurement experiments in the high-rise atmosphere all over the world have confirmed that when the aurora occurs, the radiation measurement value of the detection line of sight passing through the aurora area is obviously larger than that of the static atmosphere.

Therefore, it is of great significance to study the enhancement effect of optical phenomena in near space on infrared radiation in the medium-high rise atmosphere for accurately understanding the photochemical reaction kinetics in the medium-high rise atmosphere and assisting the design of various airborne/spaceborne infrared measurement systems.

SUMMARY

In order to overcome the defects in the prior art, the present disclosure provides a simulation device for electron-excited atmospheric radiation. The ionization excitation process of high-energy electrons to medium-high rise atmosphere can be simulated to generate a series of optical radiation phenomena in special scenes.

To achieve the above purpose, the present disclosure adopts the following technical scheme.

Disclosed is a simulation device for electron-excited atmospheric radiation. The simulation device includes a gas cell and an electron emission system.

The gas cell includes a gas cavity for accommodating gas.

The electron emission system includes an electron gun cavity and an electron gun located in the electron gun cavity.

The electron gun cavity is connected with a front end of the gas cavity. The electron gun is used for emitting electrons and injecting the electrons into the gas cavity, and the electrons collide with gas molecules in the gas cavity to ionize and excite the gas molecules.

Preferably, the electron gun cavity is connected with the front end of the gas cavity through a differential cavity. Second coaxial holes are formed in left and right side walls, connected with the electron gun cavity and the gas cavity, of the differential cavity, and the electrons emitted by the electron gun enter the gas cavity through the second coaxial holes in the left and right side walls of the differential cavity.

Preferably, turbo molecular pumps used for the electron gun cavity exhaust air in the cavity. The turbo molecular pumps are respectively arranged on upper and lower parts of the differential cavity, and are used for preventing the gas in the gas cavity from being sucked back to the electron gun cavity.

Preferably, the electron emission system further includes an electro-optical unit and a power supply.

An emission end of the electron gun is connected with the electro-optical unit. The electro-optical unit includes a plurality of electrodes arranged along an electron emission direction, and a series of first coaxial holes are formed among the electrodes along the electron emission direction. After the electrodes are electrified, a stable electrostatic field can be formed in front of the emission end of the electron gun, and the electrons emitted by the electron gun are converged into electron beams through the series of first coaxial holes to be injected into the gas cavity after the beam energy is improved.

The power supply is used for applying a direct current to the electron gun and different voltages to the electrodes of the electro-optical unit, and electron beams with different energy are obtained by changing voltage ratios among the electrodes in the electro-optical unit.

Preferably, the electrodes of the electro-optical unit include a grid electrode and a plurality of accelerating electrodes arranged in sequence along the electron emission direction.

The grid electrode is connected with a cathode of the electron gun. Isolation columns are arranged among the electrodes.

Preferably, the simulation device also includes an environmental parameter monitoring control system.

The environmental parameter monitoring control system includes an atmospheric parameter control unit, an atmospheric parameter monitoring unit and a gas proportioning unit.

The atmospheric parameter monitoring unit is used for monitoring gas concentration, air pressure and temperature in the gas cavity in real time.

The gas proportioning unit is used for proportioning the gas, and the proportioned gas is introduced into the gas cavity.

The atmospheric parameter control unit is used for controlling the gas concentration and air pressure in the gas cavity.

Preferably, the atmospheric parameter control unit adopts a vacuum air pump to pump the air in the gas cavity. The atmospheric parameter control unit includes a dry vortex pump connected with the gas cavity. The air pressure of the gas cavity is maintained to be stable by controlling the operation of the dry vortex pump.

Preferably, the simulation device also includes a spectral radiation measuring system.

The spectral radiation measuring system is connected with a back end of the gas cavity and used for measuring the emitted light from the back end of the gas cavity. The spectral radiation measuring system adopts a visible light near-infrared spectrometer to measure radiation signals in visible and infrared bands.

The simulation device has the following advantages.

Firstly, neutral gas can be directly excited by high-energy electrons to observe optical spectrum radiation, and the radiation enhancement effect of high-energy electrons on the medium-high rise atmosphere is simulated, so that experimental research of the high-energy electrons on the ionization excitation process of medium-high rise atmosphere gas is carried out.

Secondly, in order to simulate the high-altitude atmospheric environment, a vacuum cavity with good air tightness is used for isolating the gas from the outside. At the same time, in order to meet the working conditions of the electron gun and prevent the cathode from being burnt by oxidation, a plurality of cavities are connected in series to form a step pressure difference.

Thirdly, in order to ensure that high-energy electrons smoothly enter the gas cavity from the electron gun cavity and the differential cavity in sequence, second coaxial holes are formed in two side walls, connected with the electron gun cavity and the gas cavity, of the differential cavity. The second coaxial holes can maintain pressure difference between every two adjacent cavities by hundreds of times.

Fourthly, the electro-optical unit is designed to accelerate the focusing of the electrons. The electrons reach the gas cavity through a series of coaxial holes of the electro-optical unit, and electron beams with different energy can be obtained by changing the voltage ratios of the electrodes in the electro-optical unit.

Fifthly, the grid electrode in the electro-optical unit is connected with the cathode of the electron gun, and is used for restricting an electron emission cross section of the electron gun, limiting the radial divergence of the electrons and deflecting the electrons with a large off-axis angle to be converged into a main stream again, so that the stability of the electrostatic field is prevented from being damaged by secondary electrons. The isolation columns are arranged among the electrodes to ensure that the power supplies do not interfere with one another.

Sixthly, the neutral gas is excited by high-energy electrons, so that the optical phenomenon of near space is simulated, the radiation signals of the characteristic spectral lines or bands emitted by the high-energy electron-excited neutral gas are experimentally measured, and the variation characteristics of the radiation intensity with the energy of the incident electrons are researched.

Seventhly, the present disclosure constructs a simulation device for electron-excited atmospheric radiation. The ionization excitation process of high-energy electrons to neutral gas can be simulated to generate a series of optical radiation phenomena in special scenes. In addition, with the aid of optical observation equipment, optical radiation signals of ionized neutral gas can be obtained, so that radiation laws under different incident electron energies, different radiation intensities and different atmospheric components can be further obtained. The present disclosure has great significance in verifying the direction of a high-altitude atmospheric radiation model, and provides platform support for subsequent research on optical reaction characteristics such as gas ionization collision.

Eighthly, by using the device, an ionization excitation experiment is designed for single-component neutral gas (such as nitrogen or oxygen), or mixed gas. The spectral radiation signals emitted by ionized excitation gas molecules are measured by the spectral radiation measuring system at the back end, so that the characteristics of electronic excited states of different kinds of gas molecules and changes in the relationship between the radiation intensity of exciting lines and the incident electron energy are researched.

Reference signs in attached figures: 1, gas cell; 2, electron emission system; 3, environmental parameter monitoring control system; 4, spectral radiation measuring system; 5, differential cavity; 11, gas cavity; 21, electron gun cavity; 22, electron gun; 23, electro-optical unit; 231, grid electrode; 232, accelerating electrode; 233, isolation column; 234, first coaxial hole; 31, atmospheric parameter control unit; 32, atmospheric parameter monitoring unit; and 33, gas proportioning unit.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

Figure 1:
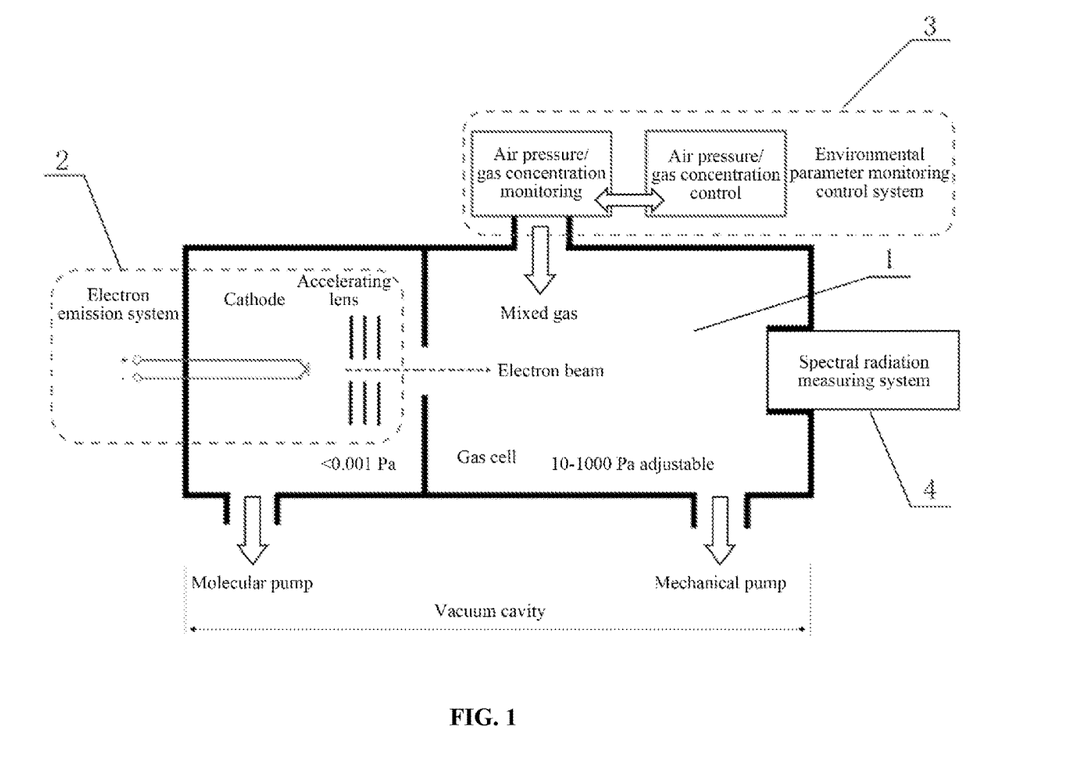
FIG. 1 is a schematic diagram of a simulation device for electron-excited atmospheric optical radiation.

As shown in FIG. 1, a simulation device for electron-excited atmospheric radiation includes a gas cell 1, an electron emission system 2, an environmental parameter monitoring control system 3 and a spectral radiation measuring system 4.

The environmental parameter monitoring control system 3 is respectively connected with an air inlet and an air outlet of the gas cell 1, and is used for preparing gas with a certain concentration according to experimental requirements and introducing the gas into the gas cell 1 through the air inlet. The environmental parameter monitoring control system 3 is also used for monitoring the gas concentration, air pressure and temperature in the gas cell 1 in real time, and adjusting and controlling the gas concentration and air pressure in the gas cell 1 through the air inlet and the air outlet. Wherein, a single or multiple gas components are proportioned by a standard gas generator.

The electron emission system 2 is connected with a front end of the gas cell 1 and used for injecting high-energy electrons into the gas cell 1. The high-energy electrons collide with gas molecules in the cell 1 to ionize and excite the gas molecules.

The spectral radiation measuring system 4 is connected with a back end of the gas cell 1 and used for collecting emitted light from the back end of the gas cell 1 and measuring optical radiation signals emitted by the ionized and excited gas molecules in the gas cell 1.

In the present disclosure, in order to simulate an atmospheric environment of an adjacent space, it is necessary to use a vacuum cavity with good air tightness to isolate the gas cell 1 from the outside. At the same time, in order to meet working conditions of an electron gun and prevent a cathode from being burnt out by oxidation, a plurality of cavities need to be connected in series to form a step pressure difference.

Figure 2:
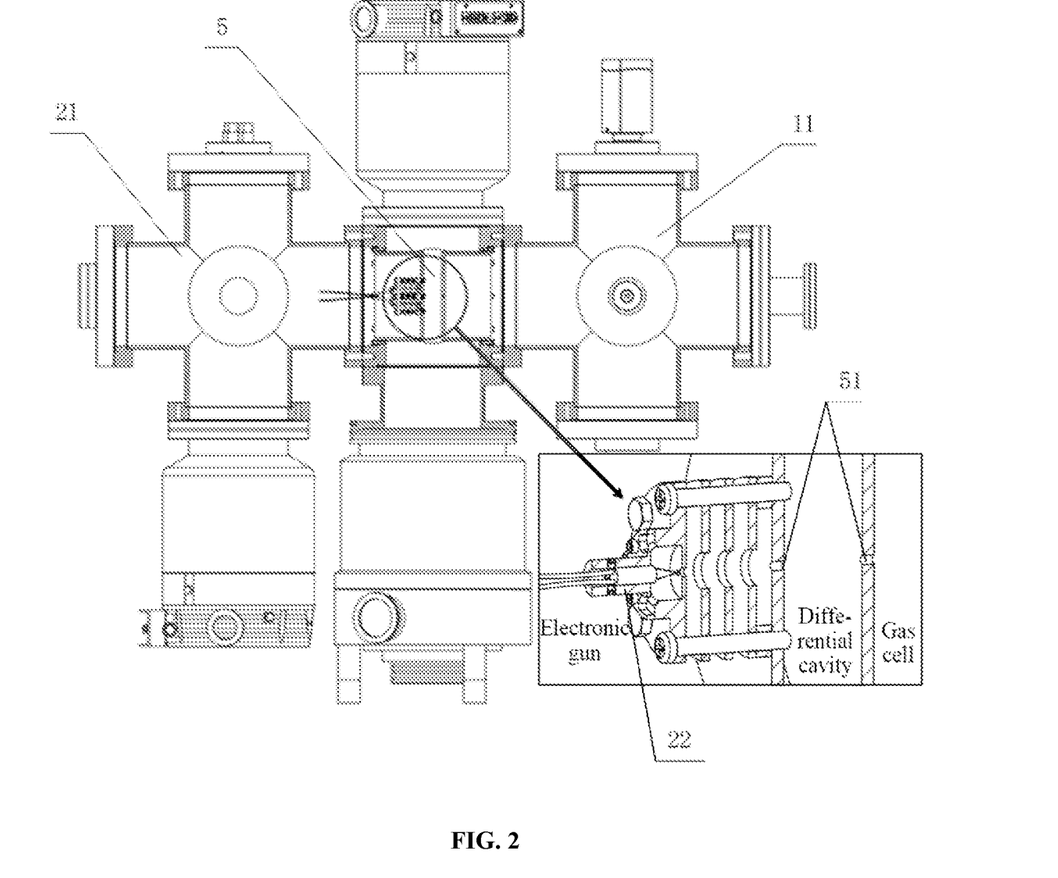
FIG. 2 is an overall diagram of a vacuum cavity with a locally amplified cavity connecting part.

As shown in FIG. 2, the gas cell 1 uses a six-way stainless steel vacuum cavity as a gas cavity 11. A front end of the gas cavity 11 is connected with a six-way electron gun cavity 21 through a square six-way differential cavity 5. Wherein, a turbo molecular pump with a pumping speed of 350 sLpm is used below the electron gun cavity 21 to exhaust air in the cavity. Turbo molecular pumps with pumping speeds of 350 sLpm and 700 sLpm are additionally arranged above and below the differential cavity 5 to prevent the gas cavity 11 from sucking the air back to the electron gun cavity 21 (a backing pump is not shown in FIG. 2). There are standard CF100 vacuum flange interfaces between the cavities and between a molecular pump and the cavity.

In order to ensure that high-energy electrons smoothly enter the gas cavity 11 from the electron gun cavity 21 and the differential cavity 5 in sequence, second coaxial holes 51 with a diameter of 2 mm are formed in two side walls of the differential cavity 5. The existence of the second coaxial holes 51 can maintain pressure difference between every two adjacent cavities by hundreds of times. CH1, CH2 and CH3 respectively represent pressure distribution of the electron gun cavity 21, the differential cavity 5 and the gas cavity 11, and the specific values can reach $9.96^{-6}$ Pa, $5.49^{-4}$ Pa and 0.148 Pa, respectively.

Figure 3:
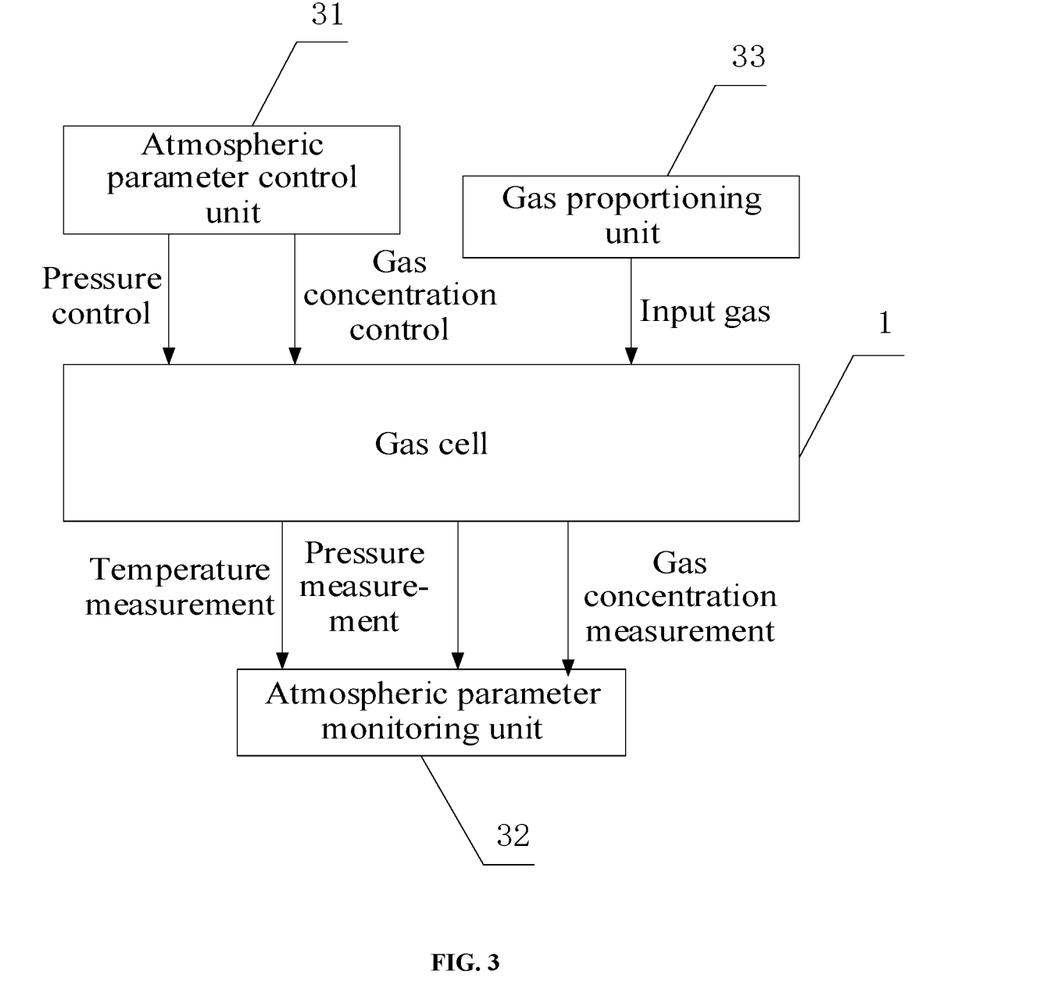
FIG. 3 is a schematic diagram of an environmental parameter monitoring control system.

In the present disclosure, as shown in FIG. 3, the environmental parameter monitoring control system 3 mainly includes an atmospheric parameter control unit 31, an atmospheric parameter monitoring unit 32 and a gas proportioning unit 33.

The atmospheric parameter monitoring unit 32 monitors temperature and air pressure in the gas cell 1 in real time.

Wherein, the atmospheric parameter monitoring unit 32 measures gas temperature with a temperature probe. The atmospheric parameter monitoring unit 32 measures the air pressure in the gas cell 1 with a full-range vacuum gauge. In this embodiment, a full-range Pirani/cold-cathode vacuum gauge is used for measuring the air pressure in the gas cell 1.

The gas proportioning unit 33 fully premixes gases with different components through a multi-channel D07-19B standard flowmeter to obtain gas with a certain concentration required by an experiment, and the proportioned gas is introduced into the gas pool 1 through a Swagelok butterfly valve. The Swagelok butterfly valve is used for adjusting the intake flow of the gas cell 1.

The atmospheric parameter control unit 31 is used for controlling the gas concentration and air pressure in the gas tank cell 1.

Wherein, the atmospheric parameter control unit 31 pumps air in the gas cell 1 with a vacuum air pump, so that the air pressure of the gas cell 1 reaches a low pressure near the space environment. In addition, in order to maintain the stability of the air pressure in the gas cell 1, the gas cell 1 is connected with a dry vortex pump. In this embodiment, the independent small dry vortex pump is connected with the gas cell 1. The atmospheric parameter control unit 31 maintains the stability of the air pressure in the gas cell 1 by controlling operating parameters of the dry vortex pump.

An ionization excitation experiment in the present disclosure not only needs to ensure that the gas cell 1 is of good air tightness, but also needs to ensure that the electron gun cell 21 still maintains high vacuum when air is sucked in the gas cell 1 so as to meet normal working conditions of the electron gun.

Figure 4:
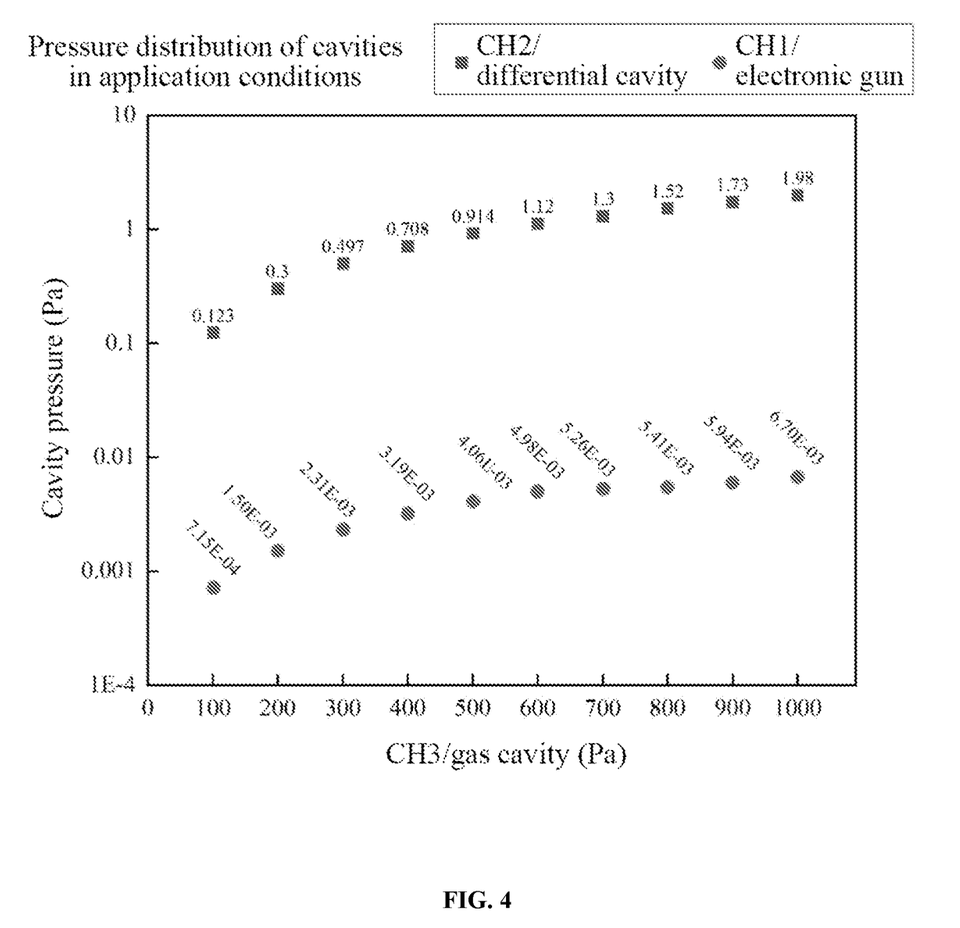
FIG. 4 is a pressure distribution diagram of cavities in application conditions.

In a verification experiment, nitrogen is introduced into the gas cavity 11, and the intake flow rate of the gas cavity 11 is gradually increased. The air pressure changes and related data of the differential cavity 5 and the electron gun cavity 21 under the application conditions of the gas cavity 11 are recorded. As shown in FIG. 4, In order to keep logarithmic scales of vertical coordinates in an appropriate scale drawing, actual CH3-CH1 and CH3-CH2 are linear. It can be seen from FIG. 4 that when the pressure of the gas cavity 11 reaches $10^3$ Pa, the pressure of the electron gun cavity 21 is only $6.70 \times 10^{-3}$ Pa, so that normal working conditions of the electron gun can be met.

Figure 5:
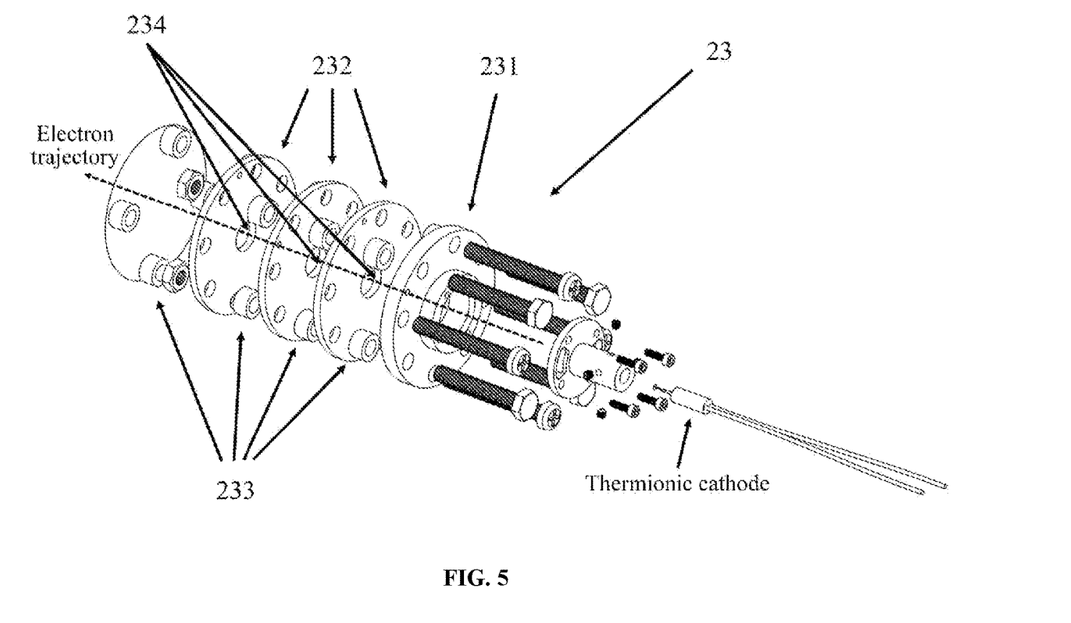
FIG. 5 is a structural schematic diagram of an electro-optical unit.

In the present disclosure, as shown in FIG. 5, the electron emission system 2 includes an electron gun 22, an electro-optical unit 23 and a power supply. The electron emission system 2 has the functions of thermionic emission, electron energy adjustment and electron beam acceleration and focusing.

A cathode of the electron gun 22 is a tungsten wire with a diameter of 0.1 mm, and a tantalum sheet with a diameter of 1.2 mm is attached to a tip of the tungsten wire, so that electrons can be emitted along the axial direction when current is applied.

Certain direct current is applied to the electron gun 22 to increase the surface temperature of the cathode, so that the average internal energy of the electrons in the cathode exceeds the work function of the material and is drawn to the surface of the tip. The beam energy is accelerated by the electro-optical unit 23 and focused on the gas cell 1.

With the increase of the direct current, the intensity of theoretical beams emitted by the cathode of the electron gun 22 is also increased. Generally, in order to ensure the service life of a thermionic cathode, heating current applied at both ends of the electron gun 22 does not exceed 2.5 A. At this time, the intensity of the theoretical beams emitted by the cathode of the electron gun 22 can be detected to be about $10^{-6}$ A.

When the electrons escape from the surface of the cathode, the initial kinetic energy is low, generally not exceeding 0.5 eV. Therefore, it is necessary to design an electro-optical unit 23, that is, an electrostatic lens, to accelerate the focusing of the electrons and reach the gas cell 1 through a series of first coaxial holes 234 of the electro-optical unit.

The electro-optical unit 23 is composed of a plurality of electrodes applying different voltages, and a series of first coaxial holes 234 are formed among the electrodes. After electrification, a stable electrostatic field can be formed in front of the electron gun and is converged into the electron beams passing through the series of first coaxial holes 234.

As shown in FIG. 5, the electrodes of the electro-optical unit 23 specifically include a grid electrode 231 and three accelerating electrodes 232 arranged in sequence along the electron emission direction, and the three accelerating electrodes 232 include a first accelerating electrode, a second accelerating electrode and a third accelerating electrode in sequence along the electron emission direction. The grid electrode 231 is connected with the cathode of the electron gun 22, and is used for restricting an electron emission cross section of the electron gun 22, limiting the radial divergence of the electrons and deflecting the electrons with a large off-axis angle to be converged into a main stream again, so that the stability of the electrostatic field is prevented from being damaged by secondary electrons. Isolation columns 233 are arranged among the electrodes to ensure that power supplies do not interfere with one another.

Figure 6:
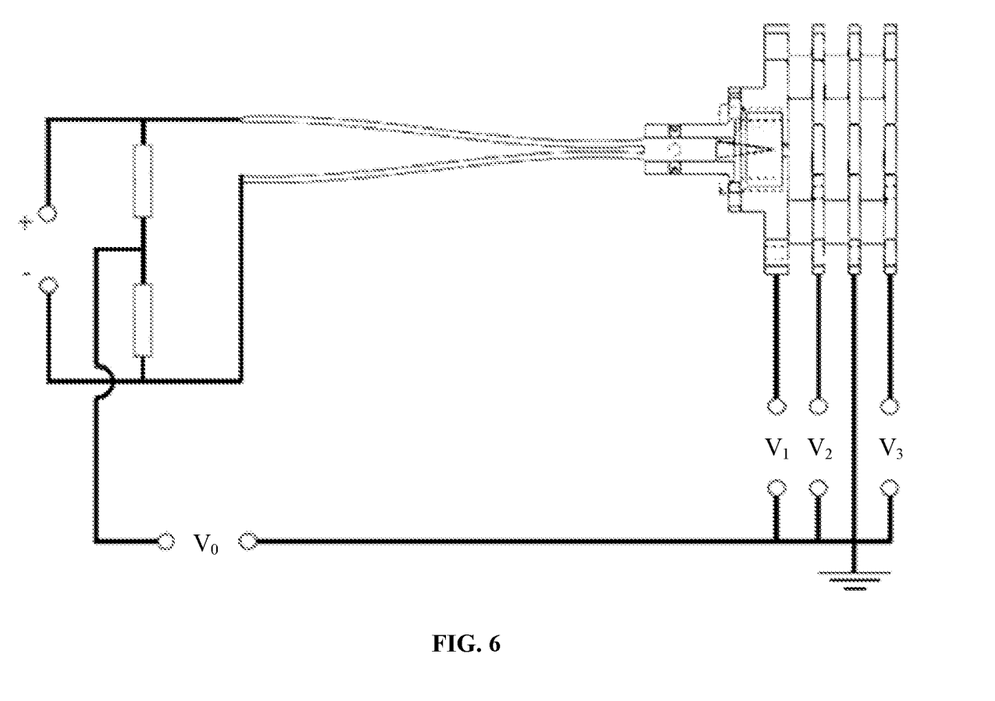
FIG. 6 is a schematic diagram of an external circuit of an electron gun.

As shown in FIG. 6, in order to ensure that an electron potential emitted by the electron gun 22 is matched with the voltage of each electrode, a floating voltage $V_0$ needs to be applied to the thermionic cathode. An external circuit that forms a closed loop with the electron gun 22 is shown in FIG. 5. A direct-current power supply and a floating voltage source are heated by connecting two filaments coupled with low-temperature drift resistors of 5 MΩ in parallel. Electrical pins of the electron gun 22 are led out from the standard CF35 flange with BNC binding posts and connected to the external circuit.

Electron beams with different energy can be obtained by changing voltage ratios among the electrodes in the electro-optical unit 23. Because it is very difficult to find a trajectory equation of the electrons in the electrostatic field by an analytical method, some mature industrial software is usually used for simulating an electron trajectory numerically. Therefore, SIMION software is used for aided design of the voltage ratios of the electrodes in the electro-optical unit 23, and accurately simulating the trajectory of the electrons in the electro-optical unit 23. In order to facilitate the comparison of subsequent experiments, three groups of electron energy (350 eV, 1500 eV and 3000 eV) are preset, and the voltage ratios of the electrodes with good focusing effect during the simulation are shown in Table 2:

TABLE 2

| Electron energy | $V_0$ (V) | $V_1$ (V) | $V_2$ (V) | $V_3$ (V) |
|---|---|---|---|---|
| 350 eV | −100 | −102 | −90 | +350 |
| 1500 eV | −500 | −503 | −420 | +1500 |
| 3000 eV | −1000 | −1002 | −102 | +3000 |

Wherein, $V_0$ is the floating voltage applied by the thermionic cathode, $V_1$ is the voltage of the grid electrode 231, $V_2$ is the voltage of the first accelerating electrode, and $V_3$ is the voltage of the third accelerating electrode. According to a circuit connection mode in FIG. 6, the voltage of the second accelerating electrode is also $V_0$.

Because the second accelerating electrode is connected to the vacuum cavity, a cavity shell is grounded (zero potential), and an internal space of the gas cell 1 can be regarded to be equipotential, and the final kinetic energy of the electron beams only depends on $V_3$. Therefore, the focusing effect can be improved by adjusting the floating voltage $V_0$ of the cathode, the voltage $V_1$ of the grid electrode 231 and the voltage $V_2$ of the first accelerating electrode. After the voltage and electronic properties of the electrodes are set, the simulated trajectory of the electron beams can be obtained, and the thermionic cathode can be lightened in the vacuum cavity by a power-on test.

Figure 7:
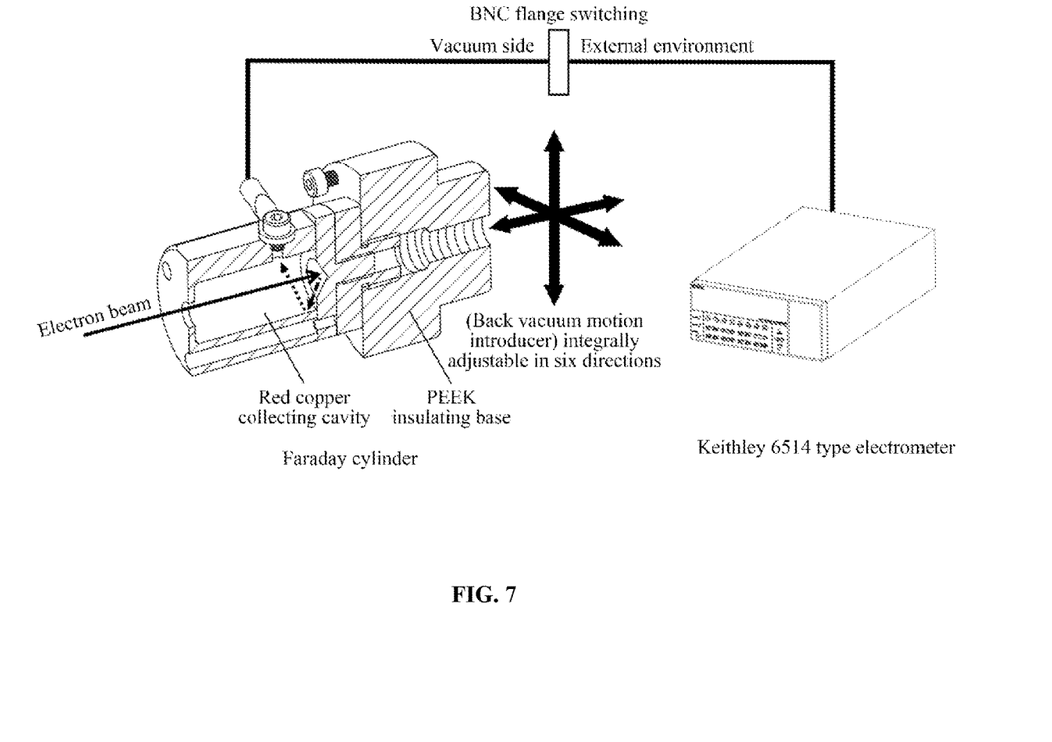
FIG. 7 is a schematic diagram of a beam detection system.

Since the electron beams cannot be directly observed, in order to detect whether the electrons enter the gas cavity 11 or not and the consistency between the simulated electron trajectory and the actual electron trajectory, it is necessary to design a beam receiving detection system. The beam receiving detection system includes the main components of a metal Faraday cylinder isolated from the cavity shell and a Keithley 6514 type electrometer. As shown in FIG. 7, the Faraday cylinder is fixed to a front end of the gas cavity 11 by a three-axis motion introducer, located in front of an electron beam inlet of the gas cavity 11, and connected to the electrometer through a vacuum BNC flange with a wire. In order to reduce the influence of the environmental electric field, a conductor is covered with a metal shielding net.

After the installation of an electron emission and receiving measuring part, the distribution of current density near the electron beam inlet of the gas cavity 11 should be measured first, and it is ensured that the Faraday cylinder and apertures are coaxial by moving the three-axis motion introducer.

Figure 8:
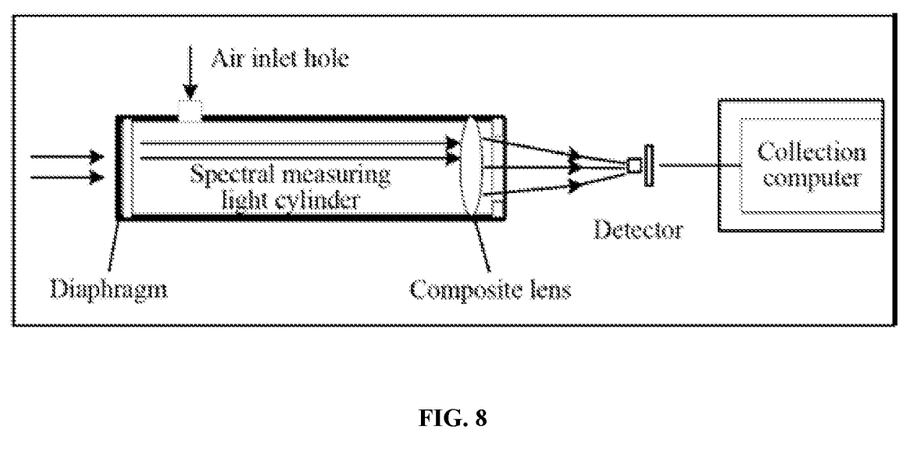
FIG. 8 is a schematic diagram of a spectral radiation measuring system.

In the present disclosure, the spectral radiation measuring system 4 is mainly composed of a visible near-infrared spectrometer. The emitted light from the back end of the gas cell 1 is measured by the spectral radiation measuring system 4. The radiation signals in visible and infrared bands in the gas cell 1 are measured.

A radiation excitation spectrum of $O_2(\alpha^1\Delta_g)$ is measured by the visible near-infrared spectrometer. A transition line from $O_2(\alpha^1\Delta_g)$ to $O_2(X^3\Sigma_g^-)$ is located at 1270 nm. By monitoring ion chemistry, the chemical reaction rate of $O_2(\alpha^1\Delta_g)$ is calculated, and a measuring optical path is shown in FIG. 8.

By using the device, an ionization excitation experiment is designed for single-component neutral gas (such as nitrogen), active infrared gas (such as carbon dioxide) and mixed gas of atmospheric components. The spectral radiation signals emitted by ionized excitation gas molecules are measured by the spectral radiation measuring system at the back end, so that the characteristics of electronic excited states of different kinds of gas molecules and changes in the relationship between the radiation intensity of exciting lines and the energy of injected high-energy electrons are researched.

In the ionization excitation experiment of single-component neutral gas, pure nitrogen or oxygen is excited by adjusting current to emit the high-energy electrons with certain energy by the electron gun. The radiation signals of characteristic spectral lines of excited electronic states of nitrogen and oxygen are measured by the visible near-infrared spectrometer. Through a neutral gas electron-excited experiment, whether the measured radiation signals contain Meinel and 1NG bands or not is checked, and whether there are other characteristic spectral lines are determined. By increasing the energy of the injected electrons step by step, the radiation intensity changes of exciting lines in excited electronic states of nitrogen and oxygen are checked. Through the ionization research of one-component neutral gas, the infrared spectral radiation measuring system is constructed to complete infrared spectral radiation measurement of electron injection.

On the basis of the above experiments, the gas cell 1 is filled with high-concentration oxygen. High-energy electrons emit electrons with certain energy to excite oxygen, and it is confirmed whether there are characteristic radiation lines such as $O_2(\alpha^1\Delta_g)0.76$ μm and $O_2(\alpha^1\Delta_g)1.27$ μm in the measured spectral lines of the spectrometer. On this basis, it is further verified whether there are other radiation lines.

In a high-altitude atmospheric radiation effect experiment, the spectral radiation measuring system 4 in vacuum environment can use window glass to seal the gas cell 1. The emitted infrared light is focused by an optical combination lens and then received by a photodetector, so that the optical radiation signals can be obtained.

Before the experiment, a gas generator is used to configure a certain proportion of mixed gas of $N_2$ and $CO_2$, and an ionization experiment research of different energy electrons injected into the mixed gas is carried out. By measuring the infrared radiation signals of the mixed gas, the central wave number and spectral shape distribution of emission bands, such as radiation bands (such as 2.7 μm and 4.3 μm) of $CO_2$ gas, can be identified. When injected electron energy is gradually increased, whether the intensity of infrared radiation bands of $CO_2$ mixed gas is gradually enhanced is observed.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A simulation device for electron-excited atmospheric radiation, comprising:
a gas cell and an electron emission system, wherein:
the gas cell comprises a gas cavity for accommodating gas;
the electron emission system comprises an electron gun cavity and an electron gun located in the electron gun cavity;
the electron gun cavity is connected with a front end of the gas cavity; and
the electron gun is used for emitting electrons and injecting the electrons into the gas cavity, and the electrons collide with gas molecules in the gas cavity to ionize and excite the gas molecules.

2. The simulation device for electron-excited atmospheric radiation according to claim 1, wherein the electron gun cavity is connected with the front end of the gas cavity through a differential cavity; and second coaxial holes are formed in left and right side walls, connected with the electron gun cavity and the gas cavity, of the differential cavity, and the electrons emitted by the electron gun enter the gas cavity through the second coaxial holes in the left and right side walls of the differential cavity.

3. The simulation device for electron-excited atmospheric radiation according to claim 2, wherein turbo molecular pumps used for the electron gun cavity exhaust air in the cavity; and the turbo molecular pumps are respectively arranged on upper and lower parts of the differential cavity, and are used for preventing the gas in the gas cavity from being sucked back to the electron gun cavity.

4. The simulation device for electron-excited atmospheric radiation according to claim 1, wherein the electron emission system also comprises an electro-optical unit and a power supply; an emission end of the electron gun is connected with the electro-optical unit; the electro-optical unit comprises a plurality of electrodes arranged along an electron emission direction, and a series of first coaxial holes are formed among the electrodes along the electron emission direction; after the electrodes are electrified, a stable electrostatic field can be formed in front of the emission end of the electron gun, and the electrons emitted by the electron gun are converged into electron beams through the series of first coaxial holes to be injected into the gas cavity after the beam energy is improved; and the power supply is used for applying a direct current to the electron gun and different voltages to the electrodes of the electro-optical unit, and electron beams with different energies are obtained by changing voltage ratios among the electrodes in the electro-optical unit.

5. The simulation device for electron-excited atmospheric radiation according to claim 4, wherein the electrodes of the electro-optical unit comprise a grid electrode and a plurality of accelerating electrodes arranged in sequence along the electron emission direction; the grid electrode is connected with a cathode of the electron gun; and isolation columns are arranged among the electrodes.

6. The simulation device for electron-excited atmospheric radiation according to claim 1, also comprising an environmental parameter monitoring control system, wherein:
the environmental parameter monitoring control system comprises an atmospheric parameter control unit, an atmospheric parameter monitoring unit and a gas proportioning unit;
the atmospheric parameter monitoring unit is used for monitoring gas concentration, air pressure and temperature in the gas cavity in real time;
the gas proportioning unit is used for proportioning the gas, and the proportioned gas is introduced into the gas cavity; and
the atmospheric parameter control unit is used for controlling the gas concentration and air pressure in the gas cavity.

7. The simulation device for electron-excited atmospheric radiation according to claim 6, wherein the atmospheric parameter control unit adopts a vacuum air pump to pump the air in the gas cavity, the atmospheric parameter control unit comprises a dry vortex pump connected with the gas cavity, and the air pressure of the gas cavity is maintained to be stable by controlling the operation of the dry vortex pump.

8. The simulation device for electron-excited atmospheric radiation according to claim 1, also comprising a spectral radiation measuring system, wherein the spectral radiation measuring system is connected with a back end of the gas cavity and used for measuring the emitted light from the back end of the gas cavity; and the spectral radiation measuring system adopts a visible light near-infrared spectrometer to measure radiation signals in visible and infrared bands.

* * * * *